Sept. 17, 1929.  B. T. WILSON  1,728,318
FURROWING MACHINE
Filed Nov. 5, 1924    2 Sheets-Sheet 1
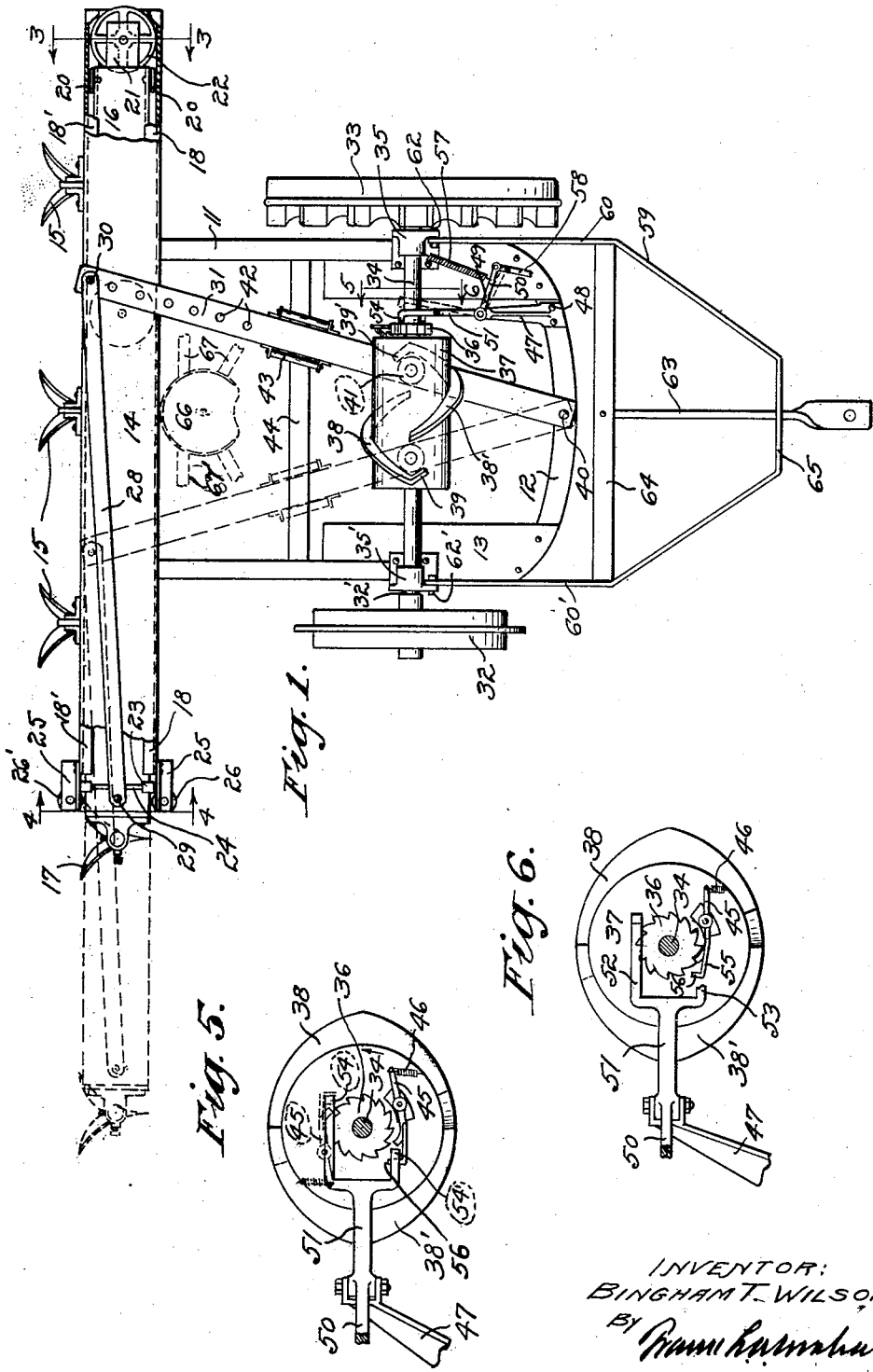
INVENTOR:
BINGHAM T. WILSON,
BY
ATTORNEY.

Sept. 17, 1929.   B. T. WILSON   1,728,318
FURROWING MACHINE
Filed Nov. 5, 1924   2 Sheets-Sheet 2
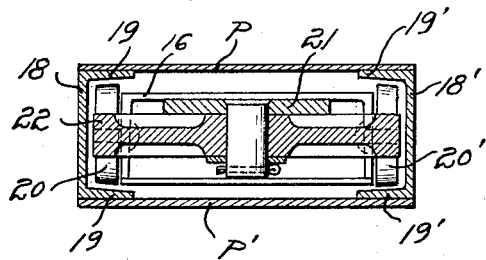
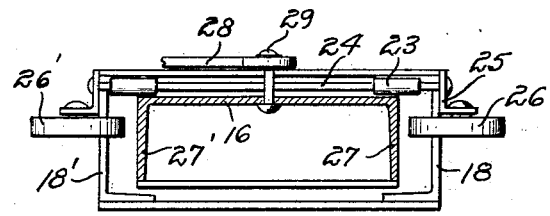
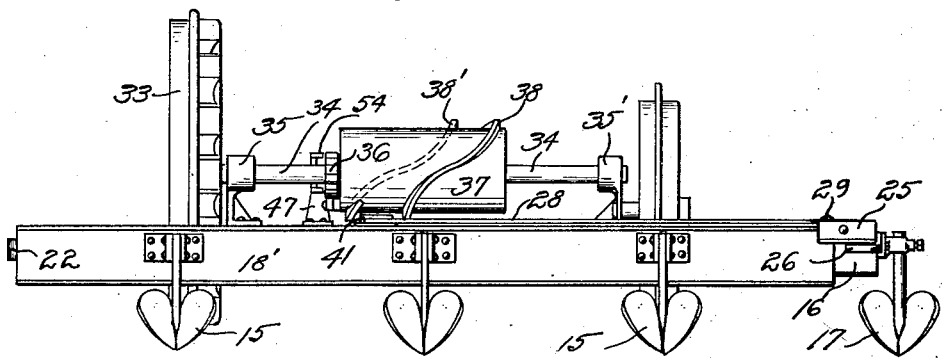
INVENTOR:
BINGHAM T. WILSON.
BY
ATTORNEY.

Patented Sept. 17, 1929

1,728,318

UNITED STATES PATENT OFFICE

BINGHAM T. WILSON, OF COVINA, CALIFORNIA, ASSIGNOR TO WILSON FARM TOOL CORPORATION, A CORPORATION OF NEVADA

FURROWING MACHINE

Application filed November 5, 1924. Serial No. 747,902.

My present invention being referred to as a furrowing machine, it may be understood to be an object of this invention to provide improved means for the opening of furrows in, for example, orchard land, which is to be irrigated; and the organization herein described is especially suitable for use in the plowing of non-parallel furrows by means of a gang of plows or earth-working blades, some of said blades being rigidly secured to a main frame, and another or others of said blades being relatively movable in such manner as to facilitate the dodging of trees, or the like.

It is an object of this invention to provide an agricultural implement comprising means for supporting a plow in such manner as to facilitate a control of lateral movements imparted thereto.

It is a further object of this invention to provide novel means for imparting lateral movement to the mentioned carriage, or its equivalent.

It is a further object of this invention to provide a new and advantageous organization facilitating a control of the lateral movement of a plow from a remote point, as from the seat of a tractor, or the like, by which my furrowing machine may be drawn; and a preferred embodiment of my invention may comprise not only a plow movable by a cam, but a ratchet wheel secured to a driven shaft, a cam drum rotatable on said shaft, and means operable from a distance, as by a pull upon a rod or a rope or a wire, to render the rotation of said ratchet wheel effective in imparting a limited rotation to said cam drum.

It is a further object of this invention to provide plow-shifting means so arranged that a plow may be quickly extended or retracted through a very considerable lateral distance.

Other objects of my invention will appear from the following description of an advantageous embodiment thereof, taken in connection with the appended claims and the accompanying drawings, in which Fig. 1 is a top plan view, with parts broken away, alternative extreme positions of certain movable parts being indicated in dash lines.

Fig. 2 is a rear elevational view of the organization shown in Fig. 1.

Figs. 3 and 4 are respectively vertical sections, on a somewhat enlarged scale, respectively taken as indicated by the lines 3—3 and 4—4 of Fig. 1.

Figs. 5 and 6 are sectional views taken as indicated by the line 5—6 of Fig. 1, Fig. 5 showing a dog as held in a disengaged position, ineffective for the rotation of a cam drum, and Fig. 6 showing the same dog in an engaged position.

Referring to the details of that specific embodiment of my invention chosen for purposes of illustration, 11 may be a main frame comprising side elements in the form of angle bars connected at their forward ends by means of a curved frame element 12 and blades 13, the rear ends of the angle bars or other side elements being secured to a transverse member 14, serving not only as a support for fixed blades or plows 15, but as a guide for a carriage 16 movable therein and carrying at its outer end an additional blade or plow 17.

Although the guide 14 may be of any preferred character, I have shown the same as extending laterally beyond ground wheels and as comprising channel bars 18, 18' having inwardly turned flanges 19, 19' shown as connected by a cover plate P and a bottom plate or straps P' and with which anti-friction rollers 20, 20', shown as secured to the inner end of the carriage 16, are adapted to engage. I may secure to the carriage 16, or to a projection 21 extending therefrom, a comparatively large wheel 22, adapted to contact alternatively with the central portion of either of the channel bars 18, 18'; and at or near the outer end of the guide 14, or its equivalent, I may provide an anti-friction roller or rollers 23, shown as rotatable upon a horizontal axis, the ends of a shaft 24 being carried through brackets 25 secured externally upon the channel bars 18, 18'. The brackets 25 may optionally be used additionally to support rollers 26, 26', shown as rotatable upon vertical axes and as adapted to contact alternatively with one or the other of the sides of the carriage 16,—this carriage being shown as in the form of a channel bar having its lateral flanges 27, 27' disposed in vertical planes.

In order to impart movement to the carriage 16, or its equivalent, I may employ means such as a rod 28, shown as overlying guide 14, as pivoted at 29 to the outer end of said carriage, and as secured at 30 to a lever 31, to which lateral movement may be imparted in any suitable way, to push or to pull upon the outer end of rod 28, or its equivalent.

For example, I may support the main frame 11 by means comprising a pair of ground wheels, one of these, as the wheel 32, being optionally mounted upon a stub axle 32' rigidly connected with the frame 11, and the opposite ground wheel 33 being adapted to serve as a bull wheel, this wheel being optionally connected with a horizontal shaft 34, rotatable in bearings 35, 35', by which said frame is suspended and rigidly connected with a ratchet wheel 36. To utilize the rotation of the ratchet wheel 36, or its equivalent, to impart movement to the lever 31, I may employ cam means including a cam drum 37, shown as provided with two correspondingly inclined spiral cams 38, 38', each extending substantially half way around said drum and provided at one end with an offset or angularly disposed terminal portion 39, 39', for a purpose hereinafter indicated. The lever 31, shown as secured at its forward end by means of a pivot 40, which may extend centrally through the curved forward element 12 of the main frame 11, may be provided with upstanding means such as a pin or roller 41, engageable alternatively by either of the cams 38, 38' to throw said lever either into the position indicated in full lines in Fig. 1, or into the position indicated in dotted lines in the same figure, thereby either retracting or extending the carriage 16, supporting the laterally movable plow 17, relatively to the guides 14 to which the fixed plows 15 are secured.

In order to control the shifting of the lever 31, which may be provided with a series of holes 42 through any of which the pin 30, connecting the rod 28, may extend, and which may optionally be provided also with rollers 43 engaging an intermediate transverse element 44 of the frame 11, any suitable means may be provided, my preferred control means being of the general character indicated in Figs. 1, 5 and 6. The ratchet 36 being continuously rotated by means such as the shaft 34 to which the wheel 33 is rigidly connected, I may mount upon the end of the cam drum 37, carrying the substantially semi-circular cams 38, 38', shaft connecting or clutch means including a dog 45, shown as constantly drawn by a tension spring 46, into a position of engagement with said ratchet. By means such as a bracket 47, shown as secured by bolts or rivets 48 to the forward element 12 of the main frame, I may pivotally secure a control lever 49 comprising an operating arm 50 and a bifurcate clutch-control arm 51, the last mentioned arm being shown as consisting of an upper branch 52 and a lower branch 53. These branches are respectively provided with inwardly extending projections or fingers 54, 54', adapted alternatively to engage a co-operating cam member 55 extending from the dog 45 and provided with an upturned end 56. This end tends (by engagement with a finger 54 or a finger 54') to disengage said dog from said ratchet, in order to prevent overrunning; and said upturned end is thereafter effective to hold said dog in a disengaged position and the carriage 16 either retracted or extended so long as the arm 51 is retained, as by means of a tension spring 57, in the inner position in which it is shown in full lines in Fig. 1.

As indicated, so long as the cam member 55, or its equivalent, is engaged by either of the fingers 54, 54', the dog 45 being thereby held in a position of disengagement, the cam drum, and all parts movable thereby, may remain stationary; but as soon as an outward movement is imparted to the arm 51, as by a pull upon a rod or rope or wire or a like tension element 58 secured to the arm 50 of the lever 49, the release of the dog 45 by the finger 54 or the finger 54', both of which fingers may be characterized as triggers, and the consequent engagement of the dog 45 with the ratchet 36 is immediately effective to impart rotation to the cam drum 37; and, assuming the pull upon the rod 58, or its equivalent, to be only momentary and the spring 57 to be effective in restoring the lever 49 to its original position, the cam drum or the dog 45 thereon may be rotated through substantially a half revolution, as from the position indicated in full lines in Fig. 5 to the position indicated in dotted lines in said figure, before an engagement between the cam element 55 on the dog 45, and the second finger, as the finger 54, on the bifurcate arm 51, shall be effective automatically to withdraw the dog 45, permitting the drum to come to a stop. The lateral pressure of the spiral cam 38 or 38' upon the pin or roller 41 secured to the lever 31 is of course effective, during a semi-revolution of the drum 37, to extend or withdraw the carriage 16; and the projections 39, 39' are effective, upon the disconnection of the clutch comprising the dog 45 and the ratchet 36, promptly to check the rotation of the drum 37, and to hold all of the mentioned movable parts stationary until a subsequent withdrawal movement imparted to the control lever 49, as by means of a second momentary pull upon the rod 58 shall again release the dog 45 and occasion a rotation of the drum 37 through another half revolution.

The entire organization described may be advanced in any suitable way, as by a subsidiary draft frame comprising a U-shaped or otherwise rebent strap 59 which may comprise substantially parallel side elements 60, 60', shown as pivoted at 62, 62' to the bearing brackets 35, 35' through which the shaft 34 extends and from which the main frame is suspended. A draw bar 63 may be pivotally or otherwise secured to a transverse element such as a channel bar 64 whose ends are secured to the side elements 60, 61, the forward end of the draw bar 63 being optionally permitted a limited lateral movement as within an opening indicated at 65. It will however be obvious that the main frame 11, or its equivalent, carrying all of the fixed and movable parts above described may be advanced by any other preferred means; and that the rod 58, or its equivalent, may be manipulated either by a direct pull thereon or by means of any suitable lever within reach of an operator or a driver. When my furrowing machine is to be drawn by a team of horses, a seat 66 may be supported in any suitable way from the frame 11, as by means of braces 67, 67' extending thereto; but it is an especial merit of the described construction that it permits of easy control from a remote point, as by means of a mere jerk rope extending from the arm 50 of the lever 49 to any point within convenient reach of a driver of a tractor.

Although I have herein described a single complete embodiment of my invention, I am aware that various changes and modifications may be made by those skilled in the art without the slightest departure from the sprit and scope of my invention, as the same is indicated above and in the following claims.

I claim as my invention:

1. An agricultural implement comprising: a main frame provided with ground wheels and carrying plows; a plow support shiftable relatively to said frame; cam means rotatable by one of said ground wheels for shifting said support a predetermined lateral distance, said cam means comprising a drum carrying separate spirals respectively adapted to advance said movable support and to retract the same, each of said spirals amounting to substantially a half turn; and means automatically limiting each advance of said cam to a half turn.

2. An agricultural implement comprising: a main frame provided with ground wheels and carrying plows; a plow support slidable relatively to said frame; and cam means rotatable by one of said ground wheels for shifting said support a predetermined lateral distance, said cam means comprising a drum carrying separate spirals respectively adapted to advance said movable support and to retract the same, each of said spirals being provided with a rebent end to check the rotation of said drum.

3. An agricultural implement comprising: a main frame provided with ground wheels and carrying plows; a plow support slidable relatively to said frame; and cam means rotatable by one of said ground wheels for shifting said support a predetermined lateral distance, said cam means being rotatable by engagement of a dog thereon with a ratchet on the shaft of a ground wheel, and means being provided for the automatic disengagement of said dog after a predetermined advance.

4. An agricultural implement comprising: a main frame provided with ground wheels and carrying plows; a plow support slidable relatively to said frame; cam means comprising a cam drum carrying a dog and rotatable by one of said ground wheels for shifting said support a predetermined lateral distance, and a control element comprising an arm pivotally supported from said main frame and provided with means for disengaging said dog.

5. An agricultural implement comprising: a main frame provided with ground wheels and carrying plows; a plow support slidable relatively to said frame; cam means comprising a drum carrying a clutch member and rotatable by one of said ground wheels for shifting said support a predetermined lateral distance and a control means comprising a finger and means rendering the withdrawal of said finger, effective to initiate rotation of said drum, and comprising also a part which is effective when released, to serve as a cam means for automatically disconnecting said clutch.

6. An agricultural implement comprising: a main frame provided with ground wheels and carrying plows; a driving shaft rotatable by one of said wheels and carrying a ratchet, a plow support slidable relatively to said frame; and cam means comprising a cam drum carrying a dog and rotatable by one of said ground wheels for shifting said support a predetermined lateral distance whenever a control element is momentarily manipulated, said control element comprising a lever having a bifurcate arm carrying projections adapted to disengage said dog on said cam drum from the ratchet on a driving shaft.

7. An agricultural implement comprising: a main frame provided with ground wheels and carrying plows; a plow support slidable relatively to said frame; and cam means comprising a cam drum on a drive shaft rotatable by one of said ground wheels for shifting said support a predetermined lateral distance whenever a control element is momentarily manipulated, said control element comprising means automatically to disconnect said drive shaft from said cam drum upon the completion of a lateral shifting of said movable support in either direction.

8. An agricultural implement comprising: a main frame supported by wheels and provided with a fixed guide extending transversely thereof beyond said wheels; a blade-supporting carriage laterally movable in said guide and having an end projecting therefrom; and shifting means, comprising a rod overlying said guide and pivoted to said projecting end, for extending said carriage by directly pushing the same from said guide.

9. An agricultural implement comprising: a main frame provided with a fixed guide extending transversely thereof; and a blade-supporting carriage laterally movable in said guide and having an end projecting therefrom; said guide being formed of channel bars oppositely disposed.

10. An agricultural implement comprising: a main frame provided with a fixed guide extending transversely thereof; a blade-supporting carriage movable in said guide and having an end projecting therefrom; said guide being formed of channel bars oppositely disposed, and secured together by means comprising a cover plate.

11. An agricultural implement comprising: a main frame provided with a fixed guide extending transversely thereof; a blade-supporting carriage movable in said guide and having an end projecting therefrom; said guide being formed of channel bars oppositely disposed, and said carriage being provided at one end with a rotatable means adapted to contact alternatively with the interior of one or the other of said channel bars.

12. An agricultural implement comprising: a main frame provided with a fixed guide extending transversely thereof; a blade-supporting carriage movable in said guide and having an end projecting therefrom; rolling anti-friction elements being provided on the inner end of said carriage and on the outer end of said guide.

13. An agricultural implement comprising: a main frame provided with a fixed guide extending transversely thereof; a blade-supporting carriage movable in said guide and having an end projecting therefrom; rolling elements rotating on axes differently inclined being provided on one end of said guide and on the opposite end of said carriage.

14. An agricultural implement comprising: a main frame; a plow supporting carriage transversely movable at the rear thereof; and moving means for said carriage comprising a rod pivotally secured thereto and connected at one end to a lever which is pivoted near the center of the front of said main frame.

15. An agricultural implement comprising: a main frame; a carriage transversely movable at the rear thereof; and moving means for said carriage comprising a rod pivotally secured thereto and connected at one end to a lever which is pivoted near the center of the front of said main frame, said lever being provided with means for a rolling contact with an intermediate transverse element of said frame.

16. An agricultural implement comprising: a main frame; a carriage transversely movable at the rear thereof; and moving means for said carriage comprising a rod secured thereto and connected at one end to a lever which is pivoted near the center of the front of said main frame, said lever being provided with means for varying the throw of said rod.

17. An agricultural implement comprising: a main frame; a carriage transversely movable at the rear thereof; moving means for said carriage comprising a rod secured thereto and connected at one end to a lever which is pivoted near the center of the front of said main frame and movable in a substantially vertical plane, said lever being provided with upstanding movement-transmitting means engageable by either of two spiral cams; and a pair of such cams adapted alternatively to engage said upstanding means for opposite effects; and means for imparting movement to said cams.

18. An agricultural implement comprising: a main frame; a carriage transversely movable at the rear thereof; and moving means for said carriage comprising a rod secured thereto and connected at one end to a lever which is pivoted near the center of the front of said main frame and movable in a substantially vertical plane said lever being provided with upstanding movement-transmitting means engageable by either of two spiral cams, a pair of such cams being mounted on a cam drum; and means for imparting movement to said drum, at will, during the advance of said implement.

19. An agricultural implement comprising: a main frame; a carriage transversely movable at the rear thereof; a cam drum and moving means for said carriage comprising a rod secured thereto and connected at one end to a lever which is pivoted near the center of the front of said main frame, said lever being provided with upstanding movement-transmitting means engageable by either of two spiral cams, said cams being secured to said cam drum and said drum being provided with means engaging said upstanding means to check the rotation of said drum.

20. An agricultural implement comprising: a main frame; a carriage transversely movable at the rear thereof; and moving means for said carriage comprising a rod secured thereto and connected at one end to a lever which is pivoted near the center of the front of said main frame said lever being provided with upstanding movement-transmitting means engageable by either of two spiral cams, said cams being secured to a cam drum provided with means engaging said upstanding means to check the rotation of said drum and said cam drum being provided with driving means and also with automatic stop means normally permitting it to be rotated through only a half revolution at a time.

21. An agricultural implement comprising: a main frame; a carriage transversely movable at the rear thereof; moving means for said carriage comprising a cam drum near the center of the front of said main frame; and control means including parts secured to said cam drum and effective for the establishment of a driving connection thereto upon the momentary manipulation of a lever, said control means comprising relatively movable parts which effect automatically a disconnection of said driving connection when said drum has been driven through substantially a half revolution.

22. An agricultural implement comprising: a main frame provided with ground wheels and carrying plows; a plow support slidable relatively to said frame; cam means rotatable by one of said ground wheels for sliding said support a predetermined lateral distance; shaft connecting means for said cam means; and control means, subject to momentary manipulation from a remote point, to initiate the carriage-sliding action of said cam, said control means including a finger which is resiliently held in an obstructing position with reference to a part of said shaft connecting means, for automatically disengaging said cam means.

In testimony whereof, I have hereunto set my hand at Los Angeles, California, this 29th day of October, 1924.

BINGHAM T. WILSON.